(12) United States Patent
Khatri

(10) Patent No.: US 10,754,870 B2
(45) Date of Patent: Aug. 25, 2020

(54) HASH-BASED DATABASE UPDATE

(71) Applicant: SAP SE, Walldorf (DE)

(72) Inventor: Kavin Khatri, Brisbane (AU)

(73) Assignee: SAP SE, Walldorf (DE)

( * ) Notice: Subject to any disclaimer, the term of this patent is extended or adjusted under 35 U.S.C. 154(b) by 553 days.

(21) Appl. No.: 15/611,521

(22) Filed: Jun. 1, 2017

(65) Prior Publication Data
US 2018/0349453 A1    Dec. 6, 2018

(51) Int. Cl.
*G06F 16/25*   (2019.01)
*G06F 16/21*   (2019.01)
*G06F 16/22*   (2019.01)
*G06F 16/23*   (2019.01)

(52) U.S. Cl.
CPC ............ *G06F 16/258* (2019.01); *G06F 16/21* (2019.01); *G06F 16/2282* (2019.01); *G06F 16/2365* (2019.01)

(58) Field of Classification Search
None
See application file for complete search history.

(56) References Cited

U.S. PATENT DOCUMENTS

2011/0208692 A1* 8/2011 Satpathy ............... G06F 16/283
                                                                707/606
2016/0335259 A1* 11/2016 Ylonen ............... G06F 21/6218

* cited by examiner

*Primary Examiner* — Giuseppi Giuliani
(74) *Attorney, Agent, or Firm* — Mintz Levin Cohn Ferris Glovsky and Popeo, P.C.

(57) ABSTRACT

A method may include generating a first hash value that is representative of a current configuration of a database storing a plurality of data records. A change in the configuration of the database may be detected based on the first hash value and a second hash value representative of a previous configuration of the database. The configuration of the database may include a plurality of database tables available for storing the plurality of data records. In response to detecting the change in the configuration of the database, the database may be updated by at least transforming the plurality of data records in accordance with the current configuration of the database. Related methods and articles of manufacture, including computer program products, are also disclosed.

16 Claims, 5 Drawing Sheets

HASH-BASED DATABASE UPDATE

TECHNICAL FIELD

The subject matter described herein relates generally to database processing and more specifically to updating database configurations.

BACKGROUND

A database may be configured to store a plurality of electronic data records. These data records may be organized into various database objects including, for example, one or more database tables. The configuration for the database may indicate which database objects are available for storing the plurality of electronic data records. Furthermore, the configuration of the database may also indicate the structure of the database objects available for storing the plurality of electronic records. For example, the configuration for the database may indicate the database tables as well as the columns within the database tables available for storing data records at the database.

SUMMARY

Systems, methods, and articles of manufacture, including computer program products, are provided for updating a database. In one aspect, there is provided a system. The system may include at least one data processor and at least one memory. The at least one memory may store instructions that result in operations when executed by the at least one data processor. The operations may include: generating a first hash value representative of a current configuration of a database storing a plurality of data records; detecting, based at least on the first hash value and a second hash value representative of a previous configuration of the database, a change in a configuration of the database, the configuration of the database comprising a plurality of database tables available for storing the plurality of data records; and in response to detecting the change in the configuration of the database, updating the database by at least transforming the plurality of data records in accordance with the current configuration of the database.

In some variations, one or more features disclosed herein including the following features can optionally be included in any feasible combination. The current configuration of the database and the previous configuration of the database may correspond to a global configuration of the database. The global configuration of the database may be applicable to all of the plurality of database tables available for storing the plurality of data records. In response to the first hash value being equal to the second hash value, a third hash value may be generated. The third hash value may be representative of a current local configuration of the database. The current local configuration of the database may be applicable to one of the plurality of database tables available for storing at least a portion of the plurality of data records. The change in the configuration of the database may be detected based at least on the third hash value and a fourth hash value representative of a previous local configuration of the database.

In some variations, the configuration of the database may be determined to have not changed based at least on the third hash value being equal to the fourth hash value. In response to the determination that the configuration of the database has not changed, the database may be updated by inserting, deleting, and/or updating one or more of the plurality of data records.

In some variations, the plurality of database tables may include a fact table and at least one dimension table. The fact table may include a key that maps to a corresponding key in the at least one dimension table. The at least one dimension table may include one or more columns for storing attributes associated with a corresponding dimension. The configuration of the database may at least indicate the fact table, the at least one dimension table, and the one or more columns as being available for storing the plurality of data records. The change in the configuration of the database may include an addition and/or a removal of the fact table, the at least one dimension table, and/or the one or more columns available for storing the plurality of data records.

In some variations, the generation of the first hash value may include applying a hash function to an extensible markup language (XML) representation of the current configuration of the database. The first hash value may be stored in place of the second hash value. The storing of the first hash value may enable a detection of a subsequent change in the configuration of the database.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Changes at a database may include both changes to the configuration of the database and changes to the data records stored at the database. While a change in database configuration may necessitate a full processing of all of the data records held at the database, a change to one or more data records stored at the database may require only a partial or incremental processing of the changed data records. However, a conventional database management system (DBMS) may update a database by performing a full processing on a periodic basis regardless of the nature of the change at the database. Such indiscriminate updates may consume an excessive amount of time and computing resources. As such, in some example embodiments, a database management system may be configured to differentiate between changes to the configuration of the database and changes to the data records stored at the database. The database management system may perform a full processing of all of the data records stored at the database only when the database management system detects a change to the configuration of the database. If the database management system determines that the change at the database is limited to the data records stored at the database, the database management system may perform only a partial processing of the changed data records.

In some example embodiments, the database management system may detect changes to the configuration of a database based on hash values representative of one or more database configurations. For example, the configuration of the database may change over time. Accordingly, the database management system may detect configuration changes by comparing the hash value of a current database configuration with the hash value of a previous database configuration. The database management system may detect a change in configuration based at least on a difference in the hash value of the current database configuration and the hash value of the previous database configuration. As noted above, the database management system may perform a full processing of all of the data records stored at the database when the database management system detects a change to the database configuration. By contrast, the database management system may perform a partial processing of the changed data records when the database management system detects a change to only the data records held at the database.

Figure 1:
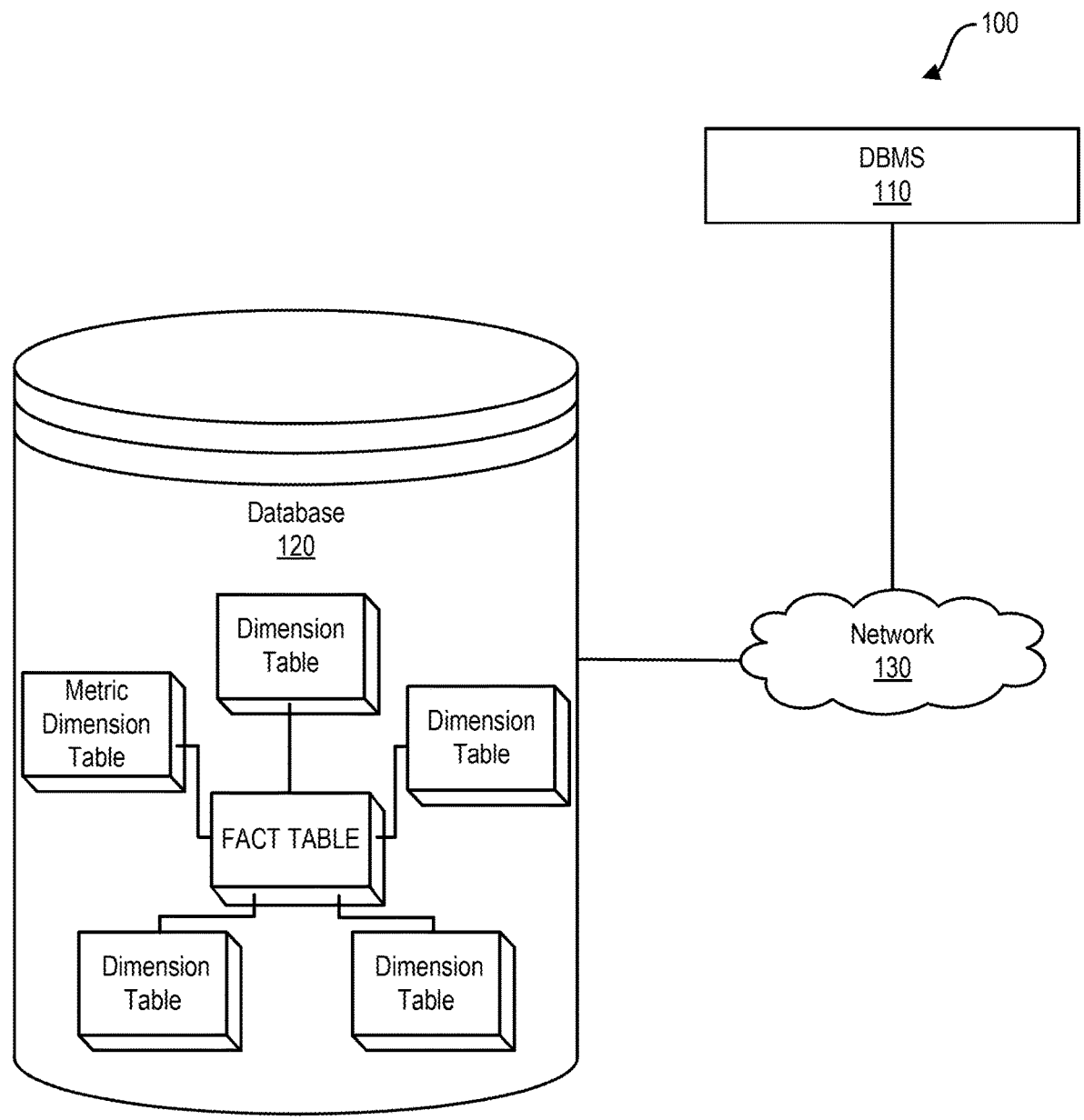
FIG. 1 depicts a system diagram illustrating a database system, in accordance with some example embodiments.

FIG. 1 depicts a system diagram illustrating a database system 100, in accordance with some example embodiments. Referring to FIG. 1, the database system 100 may include a database management system 110 that is communicatively coupled, via a network 130, to a database 120. The network 130 may be any wired and/or wireless network including, for example, a public land mobile network (PLMN), a local area network (LAN), a wide area network (WAN), the Internet, and/or the like. The database 120 may be any type of persistence including, for example, an in-memory database, a relational database, a non-SQL (NoSQL) database, and/or the like.

The database management system 110 and the database 120 may be configured to support online analytical processing (OLAP), which entails the handling of multi-dimensional analytical queries. Accordingly, the data records stored at the database 120 may be organized in accordance with a multidimensional data model, which includes a central fact table and a plurality of dimension tables connected to the fact table. Examples of such a multi-dimensional data model may include a star schema, a snowflake schema, a fact constellation, and/or the like.

As used herein, a fact table may contain facts, which may be values and/or measurements associated with a managed entity and/or system. The facts in the fact table may be associated with one or more dimensions. Thus, the fact table may contain keys that map to corresponding keys in the plurality of dimension tables. Meanwhile, each dimension table may contain attributes associated with a corresponding dimension in the fact table. It should be appreciated that the result set for a multi-dimensional analytical query may be a subset of facts that is generated by filtering the facts in the fact table based on one or more of the attributes from the plurality of dimension tables.

Figure 2:
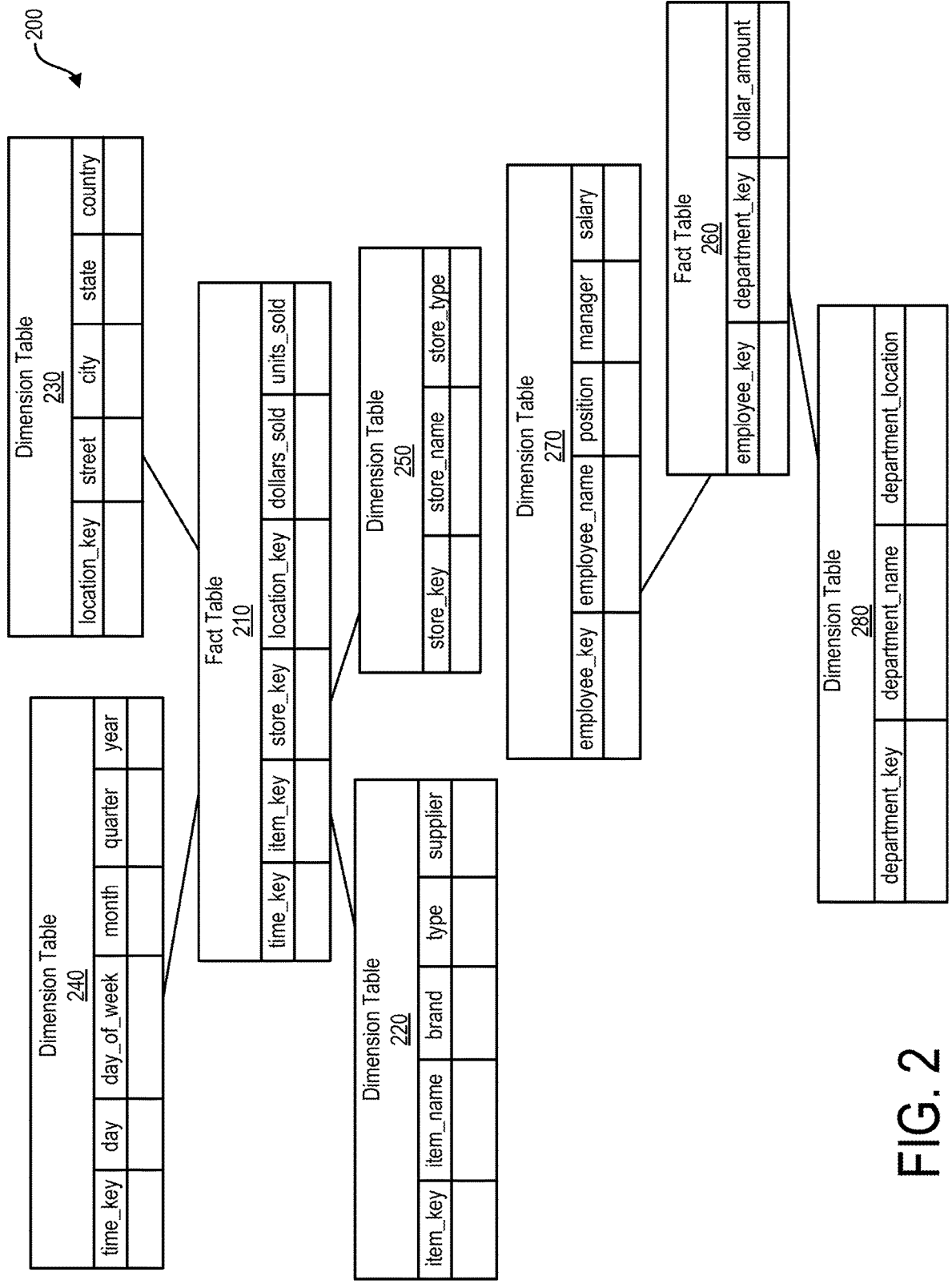
FIG. 2 depicts a multi-dimensional data model, in accordance with some example embodiments.

To further illustrate, FIG. 2 depicts a multi-dimensional data model 200, in accordance with some example embodiments. In one example, data records may be stored at the database 120 in accordance with the multi-dimensional data model 200. Referring to FIG. 2, the multi-dimensional data model 200 may include one or more fact tables including, for example, a first fact table 210 and a second fact table 260. The fact table 210 may be connected to a plurality of dimension tables including, for example, a first dimension table 220, a second dimension table 230, a third dimension table 240, and a fourth dimension table 250. The second fact table may also be connected to a plurality of dimension tables including, for example, a fifth dimension table 270 and a sixth dimension table 280.

As shown in FIG. 2, each fact in the first fact table 210 may correspond to a sales transaction having a plurality of dimensions including, for example, a time dimension, an item dimension, a store dimension, and a location dimension. Attributes associated with the each of the plurality of dimensions may be stored in a corresponding dimension table. For example, attributes associated with the time dimension may be stored in the first dimension table 220 while attributes associated with the item dimension may be stored in the second dimension table 230. Furthermore, attributes associated with the location dimension may be stored in the third dimension table 240 and attributes associated with the store dimension may be stored in the fourth dimension table 250. The first fact table 210 may include keys that map to corresponding keys in each of the first dimension table 220, the second dimension table 230, the third dimension table 240, and the fourth dimension table 250. For example, the first fact table 210 may include time keys that map to the corresponding time keys in the first dimension table 220 and item keys that map to corresponding item keys in the second dimension table 230. Furthermore, the first fact table 210 may include store keys that map to corresponding store keys in the third dimension table 240 and location keys that map to corresponding location keys in the fourth dimension table 250.

Meanwhile, each fact in the second fact table 260 may correspond to a payroll transaction having a plurality of dimensions including, for example, an employee dimension and a department dimension. Attributes associated with the employee dimension and the department dimension may be stored in corresponding dimension tables. For example, attributes associated with the employee dimension may be stored in the fifth dimension table 270 and attributes associated with the department dimension may be stored in the sixth dimension table 280. The second fact table 260 may also include keys that map to corresponding keys in each of the fifth dimension table 270 and the sixth dimension table 280. For instance, the second fact table 260 may include employee keys that map to corresponding employee keys in the fifth dimension table 270. The second fact table 260 may further include department keys that map to corresponding department keys in the sixth dimension table 280.

In some example embodiments, the configuration for the database 120 may indicate the fact tables and/or the dimension tables available for storing data records at the database 120. Referring again to FIG. 2, the configuration for the database 120 may indicate that first fact table 210 and/or the second fact table 260 are available for storing data records at the database 120. The configuration of the database 120 may further indicate that the first dimension table 220, the second dimension table 230, the third dimension table 240, the fourth dimension table 250, the fifth dimension table 270, and/or the sixth dimension table 280 are available for storing the data records of sales transactions at the database 120.

As used herein, a fact table and/or a dimension table may become available when the fact table and/or the dimension table are added to the configuration of the database 120. Meanwhile, the fact table and/or the dimension table may be unavailable when the fact table and/or dimension table are removed from the configuration of the database 120. The data records at the database 120 may be organized into and stored across the available fact tables and/or dimension tables. Adding a fact table may allow a particular type of data record, such as sales transaction records or employee records, to be stored at the database 120. Meanwhile, adding one or more dimension tables may allow various dimensions associated with a type of data record, such as the time dimension of a sales transaction record, to be stored at the database 120. Here, it should be appreciated that adding a dimension table to the configuration of the database 120 may add at least one column in a corresponding fact table. For example, adding the first dimension table 220 to the configuration of the database 120 can add, to the first fact table 210, a column for storing the item keys that map to the corresponding item keys in the first dimension table 220.

In some example embodiments, the configuration for the database 120 may further indicate the structure of the dimension tables available for storing the data records at the database 120. The structure of the dimension tables may include the columns that are available for storing the attributes associated with each dimension. As one example, the item dimension may include an item name attribute, a brand attribute, a type attribute, and a supplier attribute. Accordingly, the corresponding first dimension table 220 may have a separate column available for storing the item name attribute, the brand attribute, the type attribute, and the supplier attribute. Alternately and/or additionally, the time dimension may include a day attribute, a day of the week attribute, a month attribute, a quarter, and/or a year attribute. Thus, the corresponding third dimension table 240 may have columns available for storing each of these attributes. It should be appreciated that adding an attribute to the configuration of the database 120 may add a column to the corresponding dimension table.

It should be appreciated that two types of configurations may apply at the database 120. The configuration that applies to the database 120 as a whole may be referred to as the global configuration of the database 120. For example, the global configuration of the database may indicate the fact tables, dimension tables, and columns within the dimension tables available for storing data records at the database 120. As shown in FIG. 2, the global configuration of the 120 may include the first fact table 210, the first dimension table 220, the second dimension table 230, the third dimension table 240, the fourth dimension table 250, the second fact table 260, the fifth dimension table 270, the sixth dimension table 280, as well as all of the columns included in these dimension tables.

The configuration that applies to a portion of the database 120 may be referred to as the local configuration of the database 120. For example, one local configuration of the database 120 may apply to the first fact table 210. This local configuration may indicate that the first fact table 210 is associated with the first dimension table 220, the second dimension table 230, the third dimension table 240, and the fourth dimension table 250. This local configuration may further indicate the columns that are available in each of the first dimension table 220, the second dimension table 230, the third dimension table 240, and the fourth dimension table 250. Another example of a local configuration may apply to the second fact table 260. The local configuration for the second fact table 260 may indicate that the second fact table 260 is associated with the fifth dimension table 270 and the sixth dimension table 280 as well as the columns that are available in each of these dimension tables.

As noted earlier, the configuration of the database 120 may change over time. That is, a current configuration of the database 120 may be different from a previous configuration of the database 120 as various fact tables, dimension tables, and/or attributes of the multi-dimensional data model 200 are added and/or removed over time. Referring again to FIG. 2, the configuration of the database 120 may change by adding and/or removing the first fact table 210 and/or the second fact table 260. The configuration of the database 120 may also change by adding and/or removing the first dimension table 220, the second dimension table 230, the third dimension table 240, the fourth dimension table 250, the fifth dimension table 270, and/or the sixth dimension table 280. It should be appreciated that adding and/or removing dimension tables may also add and/or remove columns from the first fact table 210 and/or the second fact table 260.

Alternately and/or additionally, the configuration of the database 120 may change by adding and/or removing the various attributes associated with the time dimension, the item dimension, the location dimension, the store dimension, the employee dimension, and/or the department dimension. Adding and/or removing attributes may add and/or remove columns in the first dimension table 220, the second dimension table 230, the third dimension table 240, the fourth dimension table 250, the fifth dimension table 270, and/or the sixth dimension table 280.

The database management system 110 may be configured to detect changes to the configuration of the database 120 in order to determine whether to perform a full processing of all of the data records stored at the database 120. In some example embodiments, the database management system 110 may detect changes to database configuration based on hash values representative of one or more global configurations. For example, to detect changes in database configuration, the database management system 110 may compare the hash value of a current global configuration with the hash value of a previous global configuration. As noted earlier, the global configuration of the database 120 may refer to the configuration applicable to the database 120 as a whole including every fact table available for storing data records at the database 120 such as, for example, the first fact table 210 and the second fact table 260. According to some example embodiments, the database management system 110 may generate a hash value that is representative of a global configuration of the database 120 by at least applying a hash function to an extensible markup language (XML) representation of the global configuration. Table 1 below depicts an example of an XML representation for the global configuration for the database 120.

is, the current global configuration of the database 120 and the previous global configuration of the database 120 may have the same hash value despite changes in the configuration of the database 120. As such, a match in the hash value of the current global configuration and the hash value of the previous global configuration is not dispositive of a lack of change in the configuration of the database 120. Thus, when the hash value of the current global configuration matches the hash value of the previous global configuration, the database management system 110 may be configured to detect configuration changes at a more granular level. For example, the database management system 110 may detect changes in one or more local configurations. As noted earlier, a local configuration may refer to the configuration associated with an individual fact table available for storing data records at the database 120. A full processing of all of the data records stored at the database 120 may be necessary

TABLE 1

```
<root>
    <Object Class="WstDataObj.Consumer.WstCompanyOlapColumnMap">
        <Properties>
            <Property Name="CompanyId">AL_PEPSI</Property>
            <Property Name="FactTable">FACT_TABLE_1</Property>
            <Property Name="OdsMapTable">FO_EVENT_REASON_T</Property>
            <Property
Name="OdsMapColumns">INTERNAL_CODE,EFFECTIVE_END_DATE</Property>
            <Property
Name="OdsTableColumns">EMP_JOB_INFO_T.EVENT_REASON_ICODE,EMP_JOB_
INFO_T.#CALC_COL_1</Property>
        </Properties>
    </Object>
    <Object Class="WstDataObj.Consumer.WstCompanyOlapColumnMap">
        <Properties>
            <Property Name="CompanyId">AL_PEPSI</Property>
            <Property Name="FactTable">Fact_TABLE_1</Property>
            <Property Name="OdsMapTable">PICKLIST</Property>
            <Property Name="OdsMapColumns">OPTIONID/<Property>
            <Property Name="OdsTableColumns">EMP_JOB_INFO_T.EVENT</Property>
        </Properties>
    </Object>
    <Object Class="WstDataObj.Consumer.WstCompanyOlapColumnProperty">
        <Properties>
            <Property Name="CompanyId">AL_PEPSI</Property>
            <Property Name="FactTable">FACTS_TABLE_1</Property>
            <Property Name="TableId">EMP_EMPLOYMENT_INFO</Property>
            <Property Name="FactColumn">ATTRIBUTE_32</Property>
            <Property Name="OdsTableDisp">Emp Employment Info</Property>
            <Property Name="OdsColumnDisp">AssignmentTypeAgain</Property>
            <Property Name="DataType">NVarChar</Property>
            <Property Name="PropertyType">ocptSql</Property>
        </Properties>
    </Object>
</root>
```

In some example embodiments, the database management system 110 may perform a full processing of all of the data records stored at the database 120 if the hash value of the current global configuration does not match the hash value of the previous global configuration. As used herein, a full processing of all of the data records may include retrieving, from a different database, a copy of the source data corresponding to the data records stored at the database 120. The database management system 110 may further generate, based on the current global configuration, a new set of fact tables and/or dimension tables. The full processing may further include transforming the copy of the source data in accordance with the current global configuration before populating the new set of fact tables and/or dimension tables with the transformed source data.

It should be appreciated that a hash function may generate the same hash value for two or more different inputs. That when the database management system 110 detects a change with respect to any local configurations at the database 120.

In some example embodiments, the database management system 110 may detect a configuration change at the database 120 based on hash values representative of one or more local configurations. The database management system 120 may generate these hash values by applying a hash function to the XML, representations of the local configurations. For example, one local configuration may correspond to the configuration associated with the first fact table 210 while another local configuration may correspond to the configuration associated with the second fact table 260. Accordingly, to detect a change in the local configuration of the first fact table 210, the database management system 110 may at least compare a hash value of a current local configuration of the first fact table 210 with a hash value of a previous local configuration of the first fact table 210. Alternately and/or additionally, the database management system 110 may detect a change in the local configuration of the second fact table 260 by at least comparing a hash value of a current local configuration of the second fact table 260 with a hash value of a previous local configuration of the second fact table 260. The database management system 110 may perform a full processing of all of the data records stored at the database 120 when the database management system 110 detects a change in local configuration of the first fact table 210 and/or the second fact table 260.

A comparison of the hash values of the local configurations may indicate that the configuration of the database 120 have remained the same and that any changes at the database 120 are limited to the data records stored at the database 120. For example, the database management system 110 may determine that the local configuration of the first fact table 210 have not changed because the hash value of the current local configuration of the first fact table 210 matches the hash value of the previous local configuration of the first fact table 210. Furthermore, the database management system 110 may determine that the local configuration of the second fact table 260 have also remained the same because the hash value of the current local configuration of the second fact table 260 matches the hash value of the previous local configuration of the second fact table 260. Under these circumstances, the database management system 110 may perform only a partial processing of the changed data records. As used herein, a partial processing may include inserting, deleting, and/or updating one or more data records at the database 120. It should be appreciated that a partial processing of the changed data records at the database 120 may consume less time and/or computing resources than a full processing of all of the data records at the database 120. Here, the database management system 110 may perform a full processing when the hash values of the local configurations indicate that a change with respect to at least one local configuration such as, for example, the local configuration associated with the first fact table 210 and/or the second fact table 260.

Figure 3:
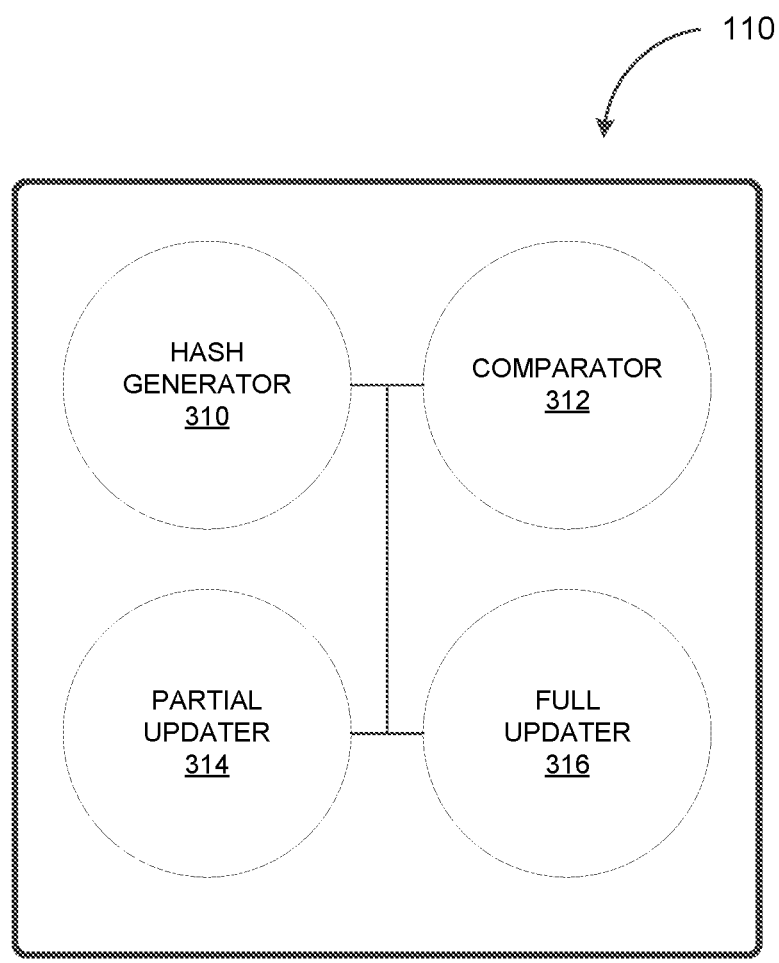
FIG. 3 depicts a block diagram illustrating a database management system, in accordance with some example embodiments.

FIG. 3 depicts a block diagram illustrating the database management system 110, in accordance with some example embodiments. Referring to FIGS. 1 and 3, the database management system 110 may include a plurality of modules including, for example, a hash generator 310, a comparator 312, a partial updater 314, and a full updater 316. It should be appreciated that the database management system 110 may include additional and/or different modules than shown.

The hash generator 310 may be configured to generate hash values representative of one or more configurations of the database 120. For example, the hash generator 310 may generate the hash value for a global configuration by applying a hash function to an XML representation of the global configuration. Alternately and/or additionally, the hash generator 310 may generate the hash value for a local configuration by applying a hash function to an XML, representation of the local configuration. As noted earlier, a global configuration of the database 120 may be the configuration across all available fact tables including, for example, the first fact table 210 and the second fact table 260. By contrast, a local configuration of the database 120 may be the configuration associated with an individual fact table such as, for example, the first fact table 210 or the second fact table 260.

In some example embodiments, the comparator 312 may be configured to detect changes in the configuration of the database 120 by at least comparing the hash value of the current global configuration of the database 120 with the hash value of the previous global configuration of the database 120. A mismatch in the hash value of the current global configuration and the hash value of the previous global configuration may indicate a change in the configuration of the database 120. As noted earlier, a change in database configuration may necessitate a full processing of all the data records stored at the database 120. Accordingly, the full updater 316 may be configured to perform a full processing in response to the mismatch in the hash value of the current global configuration and the hash value of the previous global configuration may indicate a change in the configuration of the database 120. The full updater 316 may perform the full processing by at least generating a copy of the source data associated with the data records and transforming the copied source data to accommodate for the changes in database configuration.

By contrast, a match in the hash value of the current global configuration and the hash value of the previous global configuration may cause the comparator 312 to detect configuration changes at a more granular level. This is because the match in the hash value of the current global configuration and the hash value of the previous global configuration is not dispositive of a lack of change in the configuration of the database 120. In some example embodiments, the comparator 312 may respond to a match in the hash values of global configurations by comparing the hash values of local configurations associated with the individual fact tables in the database 120. For example, the comparator 312 may compare the hash value of the current local configuration of the first fact table 210 with the hash value of the previous local configuration of the first fact table 210. Alternately and/or additionally, the comparator 312 may compare the hash value of the current local configuration of the second fact table 260 with the hash value of the previous local configuration of the second fact table 260. The comparator 312 may detect a change in the configuration of the database when any of these comparisons indicate a mismatch in hash values. Here, the full updater 316 may respond to this change in the configuration of the database 120 by performing a full processing of all of the data records stored at the database 120.

Alternately and/or additionally, the hash value of the current local configuration of the first fact table 210 may match the hash value of the previous local configuration of the first fact table 210. Furthermore, the hash value of the current local configuration of the second fact table 260 may also match the hash value of the previous local configuration of the second fact table 260. Here, the comparator 312 may determine that the configuration at the database 120 have remained the same and that any change at the database 120 is limited to the data records stored at the database 120. In response to a change that is limited to the data records stored at the database 120, the partial updater 314 may perform a partial processing by insert, delete, and/or update one or more data records at the database 120.

Figure 4:
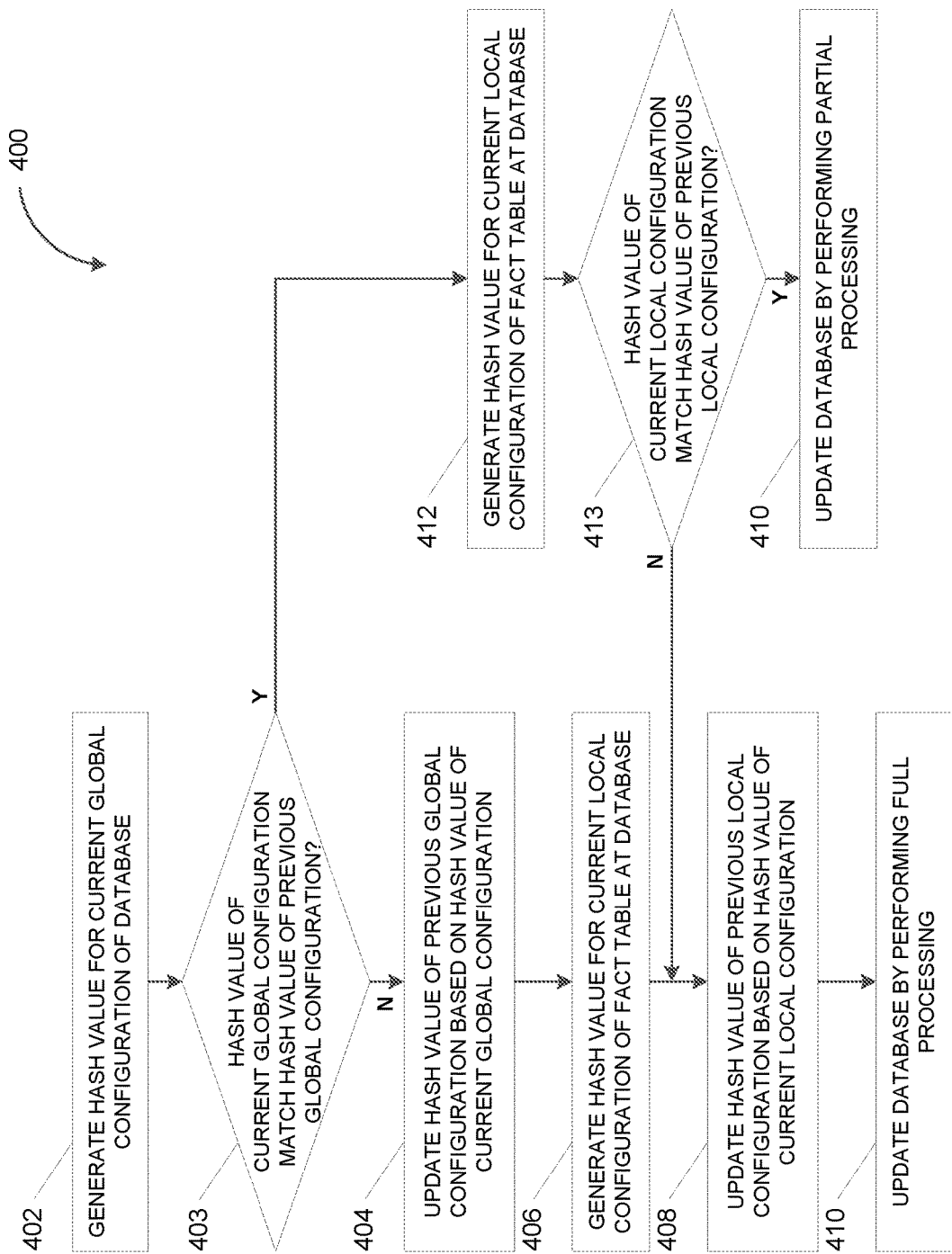
FIG. 4 depicts a flowchart illustrating a process for updating a database, in accordance with some example embodiments.

FIG. 4 depicts a flowchart illustrating a process 400 for updating a database, in accordance with some example embodiments. Referring to FIGS. 1-3, the process 400 may be performed by the database management system 110.

At 402, the database management system 110 may generate a hash value for a current global configuration of the database 120. For example, the database management system 110 may generate the hash value for the current global configuration of the database 120 by at least applying a hash function to an XML, representation of the current global configuration of the database 120. The current global configuration for the database 120 may include the configurations across all of the fact tables available for storing data records at the database 120 including, for example, the first fact table 210 and the second fact table 260.

At 403, the database management system 110 may determine whether the hash value of the current global configuration of the database 120 match a hash value of a previous global configuration of the database 120. For example, the database management system 110 may compare the hash value of the current global configuration of the database 120 to the hash value of a previous global configuration of the database 120. The hash value for the pervious global configuration of the database 120 may be generated at an earlier time such, as for example, during a last update of the database 120.

At 403-N, the database management system 110 may detect a mismatch in the hash value of the current global configuration of the database 120 and the hash value of the previous global configuration of the database 120. At 404, in response to detecting the mismatch, the database management system 110 may update the hash value of the previous global configuration based on the hash value of the current global configuration. In some example embodiments, a mismatch in the hash value of the current global configuration of the database 120 and the hash value of the previous global configuration of the database 120 may indicate a change in the configuration of the database 120. As such, the database management system 110 may change the hash value of the previous global configuration of the database 120 to the hash value of the current global configuration of the database 120. Doing so may enable the database management system 110 to detect future changes in the configuration of the database 120.

Furthermore, at 406, the database management system 110 may generate a hash value for a current local configuration of at least one fact table at the database 120. For example, the database management system 110 may generate a hash value for the current local configuration of the first fact table 210 by applying a hash function to an XML representation of the current local configuration of the first fact table 210. Alternately and/or additionally, the database management system 110 may generate a hash value for the current local configuration of the second fact table 260 by applying a hash function to an XML, representation of the current local configuration of the second fact table 260.

At 408, the database management system 110 may update a hash value for a previous local configuration of the at least one fact table based on the hash value of the current local configuration of the at least one fact table. In some example embodiments, the database management system 110 may further respond to a change in the configuration of the database 120 by storing the hash values of the current local configurations associated with individual fact tables at the database 120 including, for example, the first fact table 210 and the second fact table 260. Storing these hash values may enable the database management system 110 to detect future configuration changes at a more granular level. As noted earlier, the database management system 110 may be required to detect configuration changes at a more granular level when the hash value of the current global configuration of the database 120 matches the hash value of the previous global configuration of the database 120.

At 410, the database management system 110 may update the database 120 by at least performing a full processing of all the data records stored at the database 120. For instance, the database management system 110 may perform the full processing by at least generating a copy of the source data associated with the data records and transforming the copied source data to accommodate for the changes in database configuration.

Alternately and/or additionally, at 403-Y, the database management system 110 may detect a match in the hash value of the current global configuration of the database 120 and the hash value of the previous global configuration of the database 120. Thus, at 412, the database management system 110 may generate a hash value for a current local configuration of at least one fact table at the database 120. At 413, the database management system 110 may determine whether the hash value of the current local configuration of the at least one fact table matches a hash value of a previous local configuration of the at least one fact table.

As noted earlier, a match in the hash value of the current global configuration and the hash value of the previous global configuration is not dispositive of a lack of change in the configuration of the database 120. Hence, in the event that the hash value of the current global configuration matches the hash value of the previous global configuration, the database management system 110 may detect configuration changes on a more granular level including the local configurations of each fact table at the database 120. For example, the database management system 110 may generate a hash value for the current local configuration of the first fact table 210 by applying a hash function to an XML representation of the current local configuration of the first fact table 210. Alternately and/or additionally, the database management system 110 may generate a hash value for the current local configuration of the second fact table 260 by applying a hash function to an XML representation of the current local configuration of the second fact table 260. The database management system 110 may compare the hash value of the current local configuration of the first fact table 210 with a hash value of a previous local configuration of the first fact table 210. The database management system 110 may further compare the hash value of the current local configuration of the second fact table 260 with a hash value of a previous local configuration of the second fact table 260.

At 413-Y, the database management system 110 may detect a match in the hash value of the current local configuration of the at least one fact table and the hash value of the previous local configuration of the at least one fact table. Accordingly, at 414, the database management system 110 may update the database 120 by at least performing a partial processing of one or more changed data records at the database 120. For example, the database management system 110 may determine that the local configuration of the first fact table 210 have not changed because the hash value of the current local configuration of the first fact table 210 matches the hash value of the previous local configuration of the first fact table 210. Furthermore, the database management system 110 may determine that the local configuration of the second fact table 260 have also remained the same because the hash value of the current local configuration of the second fact table 260 matches the hash value of the previous local configuration of the second fact table 260. Under these circumstances, the database management system 110 may perform only a partial processing of the changed data records by inserting, deleting, and/or updating one or more data records at the database 120.

Alternately and/or additionally, at 413-N, the database management system 110 may detect a mismatch in the hash value of the current local configuration of the at least one fact table and the hash value of the previous local configuration of the at least one fact table. As such, the process 400 may continue at operation 408 where the database management system 110 updates a hash value for a previous local configuration of the at least one fact table based on the hash value of the current local configuration of the at least one fact table. Furthermore, at 410, the database management system 110 may update the database 120 by at least performing a full processing of all the data records stored at the database 120. As noted earlier, the database management system 110 may detect a configuration change at the database 120 when the database management system 110 detects a change in the local configuration of any fact table at the database 120 (e.g., the first fact table 210 and/or the second fact table 260). This configuration change may trigger a full processing of all of the data records stored at the database 120. Moreover, the database management system 110 may also store the hash values of the current local configurations. These hash values may be used when the database management system 110 is required to detect future configuration changes at a more granular level.

Table 2 below depicts pseudo program code for implementing the process 400.

TABLE 2

```
GlobalTemplateXML <= Get all Global Template configurations AND concatenate XML
GlobalTemplateXMLHashcode <= GenerateHashCode(GlobalTemplateXML)
CompanyXML <= Get all Company configurations AND concatenate XML
CompanyXMLHashcode <= GenerateHashCode(CompanyXML)
IF CompanyXMLHashcode EQUALS GlobalTemplateXMLHashcode THEN
        RUN INCREMENTAL
ELSE
        RUN INITIAL
```

Figure 5:
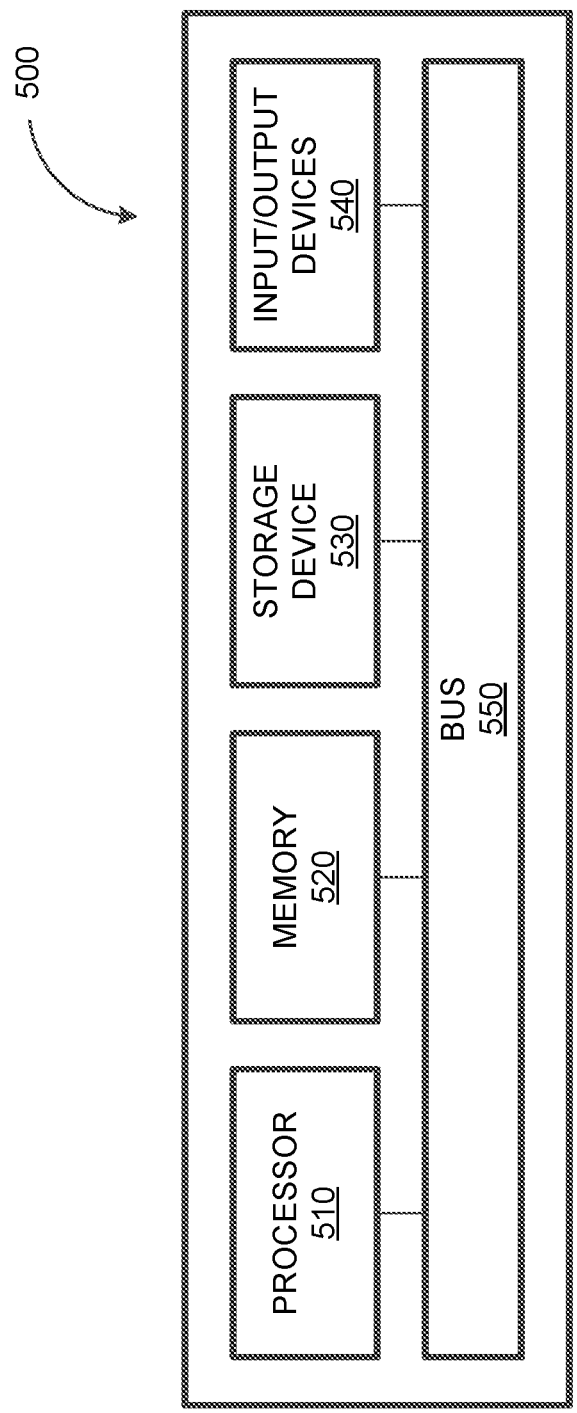
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        generating a first hash value representative of a current global configuration of a database storing a plurality of data records, the current global configuration of the database being applicable to all of a plurality of database tables available at the database for storing the plurality of data records;
        in response to the first hash value being equal to a second hash value representative of a previous global configuration of the database, generating a third hash value representative of a current local configuration of the database, the current local configuration of the database being applicable to one of the plurality of database tables available for storing at least a portion of the plurality of data records;
        detecting, based at least on the third hash value and a fourth hash value representative of a previous local configuration of the database, a change in a local configuration of the database; and
        in response to detecting the change in the local configuration of the database, updating the database by at least transforming at least the portion of the plurality of data records in accordance with the current local configuration of the database.

2. The system of claim 1, further comprising:
    determining, based at least on the first hash value being equal to the second hash value, that a global configuration of the database has not changed;
    determining, based at least on the third hash value being equal to the fourth hash value, that the local configuration of the database has not changed; and
    in response to determining that the global configuration and the local configuration of the database have not changed, updating the database by at least one of inserting, deleting, and updating one or more of the plurality of data records.

3. The system of claim 1, wherein the plurality of database tables includes a fact table and at least one dimension table, the fact table including a key that maps to a corresponding key in the at least one dimension table.

4. The system of claim 3, wherein the at least one dimension table includes one or more columns for storing attributes associated with a corresponding dimension.

5. The system of claim 4, wherein the configuration of the database at least indicates the fact table, the at least one dimension table, and the one or more columns as being available for storing the plurality of data records.

6. The system of claim 5, wherein the change in the configuration of the database comprises at least one of adding and removing the fact table, the at least one dimension table, or the one or more columns available for storing the plurality of data records.

7. The system of claim 1, wherein the generation of the first hash value comprises applying a hash function to an extensible markup language (XML) representation of the current configuration of the database.

8. The system of claim 1, further comprising:
storing the first hash value in place of the second hash value, the storing of the first hash value enabling a detection of a subsequent change in the configuration of the database.

9. A computer-implemented method, comprising:
generating a first hash value representative of a current global configuration of a database storing a plurality of data records, the current global configuration of the database being applicable to all of a plurality of database tables available at the database for storing the plurality of data records;
in response to the first hash value being equal to a second hash value representative of a previous global configuration of the database, generating a third hash value representative of a current local configuration of the database, the current local configuration of the database being applicable to one of the plurality of database tables available for storing at least a portion of the plurality of data records
detecting, based at least on the third hash value and a fourth hash value representative of a previous local configuration of the database, a change in a local configuration of the database; and
in response to detecting the change in the local configuration of the database, updating the database by at least transforming at least the portion of the plurality of data records in accordance with the current local configuration of the database.

10. The computer-implemented method of claim 9, further comprising:
determining, based at least on the first hash value being equal to the second hash value, that a global configuration of the database has not changed;
determining, based at least on the third hash value being equal to the fourth hash value, that the local configuration of the database has not changed; and
in response to determining that the global configuration and the local configuration of the database have not changed, updating the database by at least one of inserting, deleting, and updating one or more of the plurality of data records.

11. The computer-implemented method of claim 9, wherein the plurality of database tables includes a fact table and at least one dimension table, the fact table including a key that maps to a corresponding key in the at least one dimension table.

12. The computer-implemented method of claim 11, wherein the at least one dimension table includes one or more columns for storing attributes associated with a corresponding dimension.

13. The computer-implemented method of claim 12, wherein the configuration of the database at least indicates the fact table, the at least one dimension table, and the one or more columns as being available for storing the plurality of data records.

14. The computer-implemented method of claim 13, wherein the change in the configuration of the database comprises at least one of adding and removing the fact table, the at least one dimension table, or the one or more columns available for storing the plurality of data records.

15. The computer-implemented method of claim 9, further comprising:
storing the first hash value in place of the second hash value, the storing of the first hash value enabling a detection of a subsequent change in the configuration of the database.

16. A non-transitory computer-readable storage medium including program code, which when executed by at least one data processor, cause operations comprising:
generating a first hash value representative of a current global configuration of a database storing a plurality of data records, the current global configuration of the database being applicable to all of a plurality of database tables available at the database for storing the plurality of data records;
in response to the first hash value being equal to a second hash value representative of a previous global configuration of the database, generating a third hash value representative of a current local configuration of the database, the current local configuration of the database being applicable to one of the plurality of database tables available for storing at least a portion of the plurality of data records
detecting, based at least on the third hash value and a fourth hash value representative of a previous local configuration of the database, a change in a local configuration of the database; and
in response to detecting the change in the local configuration of the database, updating the database by at least transforming at least the portion of the plurality of data records in accordance with the current local configuration of the database.

* * * * *